Figure 1:
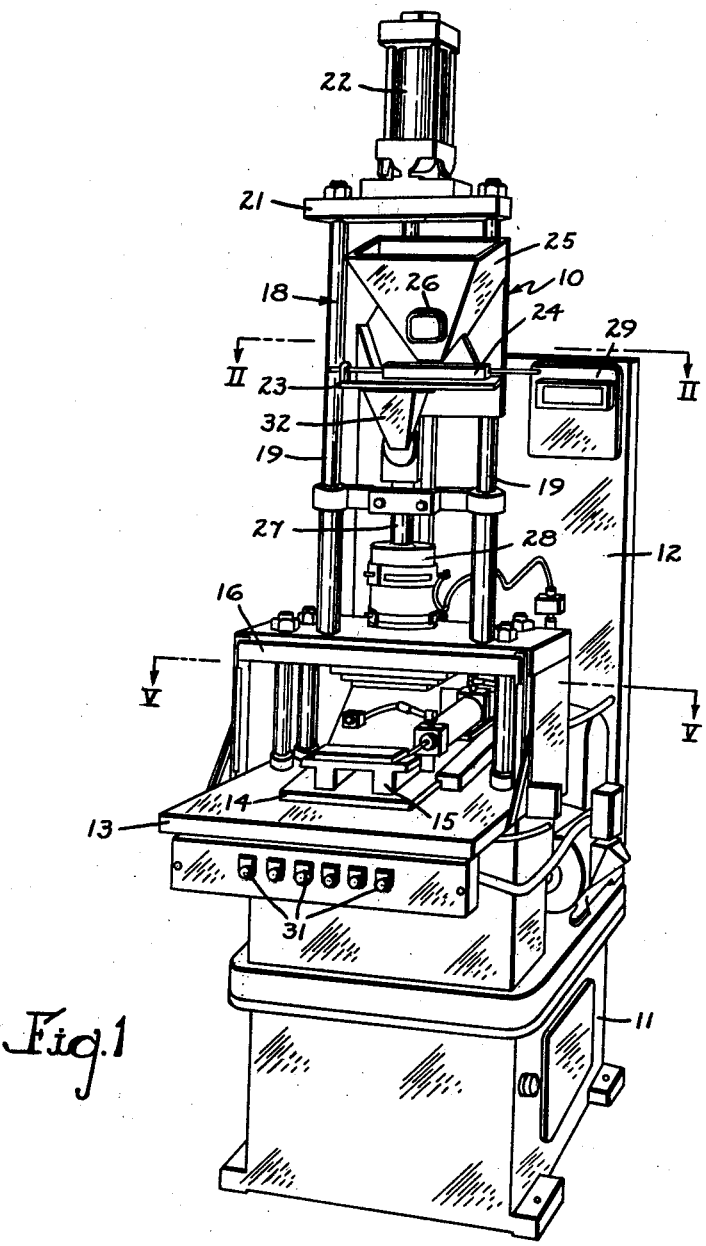

April 14, 1964  A. S. JOHNSON, JR., ETAL  3,128,502
INJECTION MOLDING MACHINE

Filed June 30, 1961

4 Sheets-Sheet 1

INVENTORS
Arvid S. Johnson Jr.
BY Cornelius T. Kelleher
Norman S. Blodgett
Attorney April 14, 1964  A. S. JOHNSON, JR., ETAL  3,128,502
INJECTION MOLDING MACHINE Filed June 30, 1961  4 Sheets-Sheet 2

INVENTORS
Arvid S. Johnson Jr.
BY Cornelius T. Kelleher
Norman S. Blodgett
Attorney INVENTORS
Arvid S. Johnson Jr.
BY Cornelius T. Kelleher
Norman S. Blodgett
Attorney April 14, 1964

A. S. JOHNSON, JR., ETAL 3,128,502

INJECTION MOLDING MACHINE

Filed June 30, 1961

4 Sheets-Sheet 4

INVENTORS
Arvid S. Johnson Jr.
BY Cornelius T. Kelleher

Norman L. Blodgett
Attorney

United States Patent Office 3,128,502
Patented Apr. 14, 1964

3,128,502
INJECTION MOLDING MACHINE
Arvid S. Johnson, Jr., Northboro, and Cornelius T. Keileher, Holden, Mass., assignors to Progressive Tool & Die Company, Shrewsbury, Mass., a corporation of Massachusetts
Filed June 30, 1961, Ser. No. 121,019
3 Claims. (Cl. 18—30)

This invention relates to an injection molding machine and more particularly to apparatus arranged to produce articles from plastic by causing molten plastic material to flow under pressure into a closed die.

It is common practice in injection molding to make use of a vertical molding machine in which one die faces downwardly and is fastened to a downwardly-directed surface of a fixed platen, while the other die faces upwardly and is fastened to the top surface of a movable platen. The movable platen is usually slidable on vertical guides and is actuated by a hydraulic cylinder through a toggle arrangement. Mounted above the top platen is a nozzle arrangement. Mounted above the nozzle is located a heating chamber which is fed by a feed-regulating means having a hopper above it in which the raw plastic is placed. A hydraulic feed cylinder operates above the top platen and forces plastic, which has been made molten in the heating chamber, into the cavity which is formed by the two dies and which determines the shape of the finished article. The lower end of the nozzle engages the upper surface of the platen so that the nozzle opening matches an opening which passes through the platen. The lower end of the opening through the platen matches an opening in the die. Now, in the past, when the molding cycle had been completed and the platen with the upper die was raised to permit removal of the molded piece, the molten plastic continued to flow out of the nozzle slightly despite the fact that the plastic-injecting pressure had been removed from the main body of plastic. When this "dribble" had cooled, it presented a solid piece of plastic which was squeezed between the molds during the next molding cycle wtih possible damage to the mold or interruption of the work cycle. It has also been difficult in operating these machines to determine the amount of material which is presented by the feed-regulating means at each cycle; if the feed-regulating means presents too much or too little plastic during each cycle, and undesirable situation exists. If too little plastic is presented, of course, the entire plastic article will not be formed. If too much plastic is introduced in each cycle, eventually the plastic accumulates in the heating chamber because the die does not use all of the plastic and, eventually, the movement of the pressure-generating piston against this excess build-up of molten plastic causes leakage of the plastic through the joints in the die producing undesirable flash on the finished article which must be removed by hand and which represents a waste of plastic. These and other difficulties experienced with the prior art devices have been obviated in a novel manner by the present invention.

It is, therefore, an outstanding object of the invention to provide an injection molding machine providing for very accurate feeding of raw plastic into the apparatus and precise cut-off of plastic flow into the die.

Another object of this invention is the provision of an injection molding machine in which feeding of raw plastic into the injection mechanism is very accurately brought about by simple mechanism.

A further object of this invention is the provision of an injection machine in which a hard excess of plastic or "dribble" is not produced at the injection nozzle.

It is another object of the instant invention to provide an injection molding machine having an accurate feed mechanism operated in synchronism with an accurate molten plastic feed cut-off at the injection nozzle.

It is a further object of the invention to provide an injection molding machine having a dribble-preventing means operating in synchronization with the other operating elements of the machine.

A still further object of this invention is the provision of an injection molding machine having a raw plastic feed regulating apparatus operated in synchronization with the other elements of the machine.

With these and other objects in view, as will be apparent to those skilled in the art, the invention resides in the combination of parts set forth in the specification and covered by the claims appended hereto.

Figure 2:
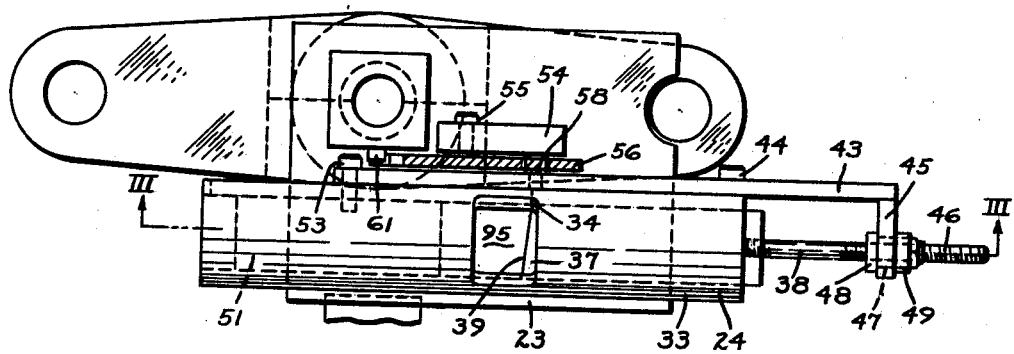
Figure 3:
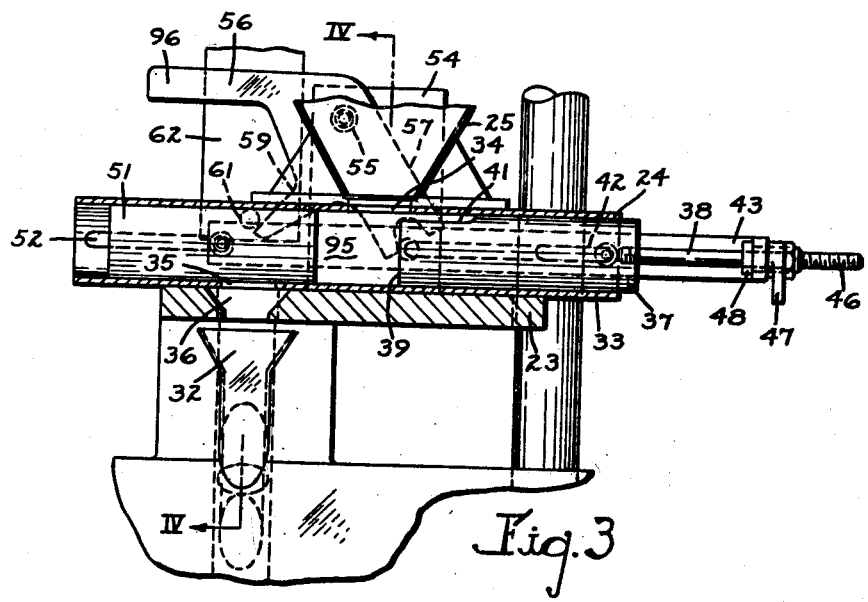
Figure 4:
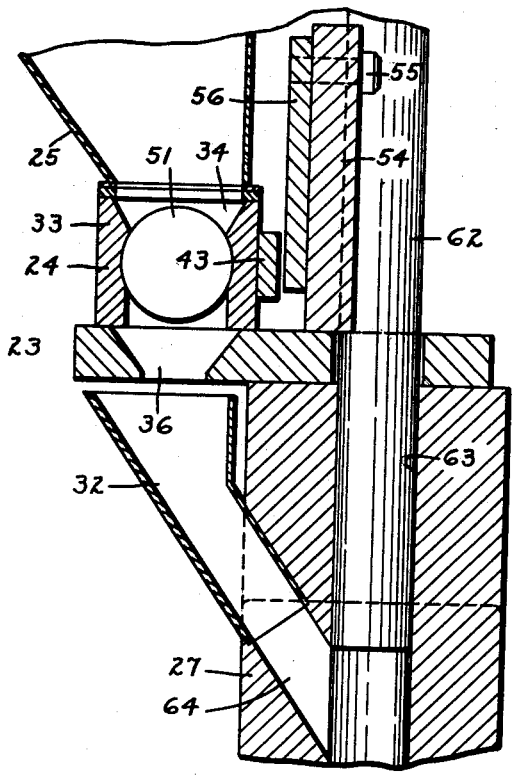
Figure 5:
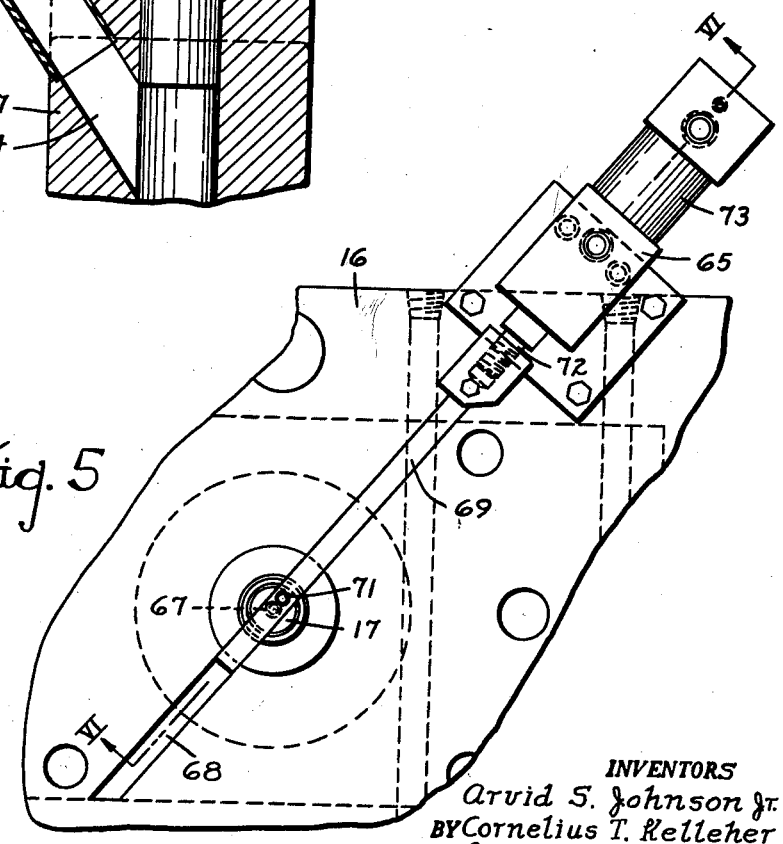
Figure 6:
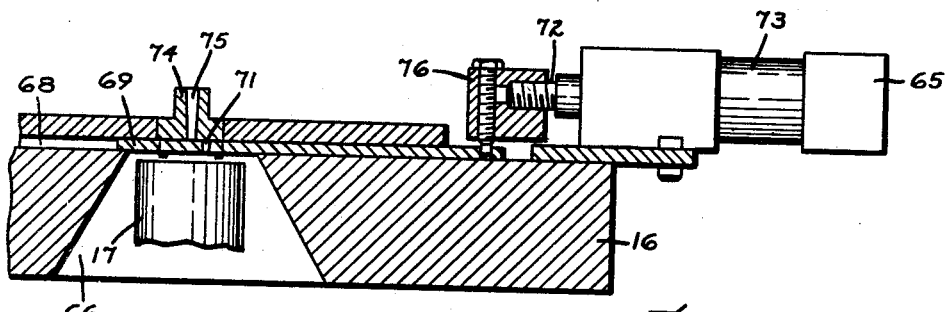
Figure 7:
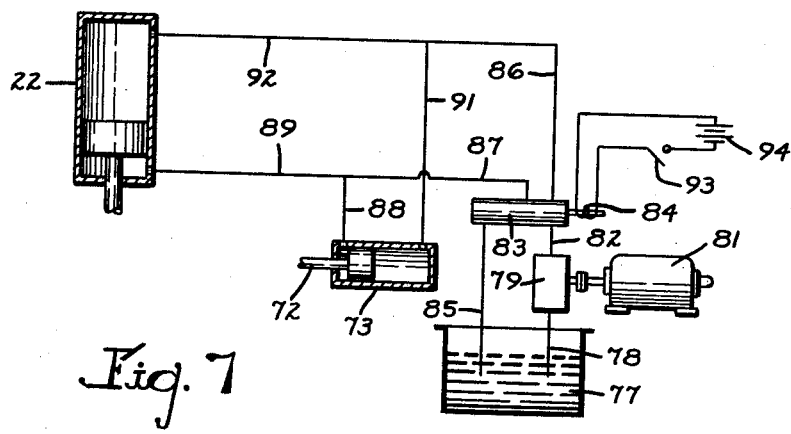

The character of the invention, however, may be best understood by reference to one of its structural forms, as illustrated by the accompanying drawings in which:

FIG. 1 is a perspective view of an injection molding machine embodying the principles of the present invention, FIG. 2 is a horizontal sectional view of the machine taken on the line II—II of FIG. 1, FIG. 3 is a vertical sectional view of the machine taken on the line III—III of FIG. 2, FIG. 4 is a vertical sectional view of the machine taken on the line IV—IV of FIG. 3, FIG. 5 is a horizontal sectional view of the machine taken on the line V—V of FIG. 1, FIG. 6 is a vertical sectional view of the machine taken on the line VI—VI of FIG. 5, and FIG. 7 is a schematic view of the hydraulic connections in the machine.

In the description which follows, the expressions "front," "rear," "transverse," and the like, refer to the directions in the machine as they appear to an operator facing the front or operating side of the machine.

Referring first to FIG. 1, wherein are best shown the general features of the invention, the injection molding machine, indicated by the reference numeral 10, is shown as consisting of a base 11 at the rear of which extends an electrical control panel 12. Mounted for vertical sliding motion on the top of the base 11 is a table 13 carrying a lower platen 14 which is slidable backward and forward over the top of the table 13. Mounted on the platen 14 is a lower half 15 of the die. Overlying this is the upper platen 16 which is generally horizontal and is fixed relative to the base 11; suspended from the lower surface of the upper platen is the upper half 17 of the die. On top of the upper platen 16 is mounted a superstructure 18 having supporting bars 19 having at their upper ends a table 21 on which is mounted a hydraulic linear actuator or feed cylinder 22. At an intermediate part of the superstructure is provided a table 23 on which is mounted a feed-regulating apparatus 24 having a hopper 25 mounted above it, the hopper being provided with an observation window 26. Underlying the cylinder 22 and rearwardly of the hopper 25 and the feed-regulating means 24 is a feed tube 27 the lower end of which is connected to a heating chamber 28. A meter 29 mounted on the front of the panel 12 gives an indication of electrical power absorption by the heating means. At the front of the table 13 are control buttons 31 for actuating various parts of the apparatus out of the normal automatic cycle. A chute 32 extends from the feed-regulating apparatus 24 to the tube 27.

With reference to FIGS. 2, 3, and 4, it can be seen that the feed-regulating apparatus 24 consists of a tubular cylinder 33 having a first opening 34 which underlies the hopper 25 and a second opening 35 which is spaced from the first opening and overlies an aperture 36 leading to the chute 32.

Mounted in the cylinder 33 is a piston 37 having one end extending, on occasion, from the end of the cylinder and having fastened thereto an axial rod 38. The other or inner end of the piston 37 is provided with a vertical plane end surface 39 which lies at a slight angle to the axis of the cylinder as is evident in FIG. 2. The upper part of the piston 37 is provided with a flat 41 which extends axially along the piston for a considerable distance and which, at all times during movement of the piston 37, has a portion underlying the first opening 34. At the rear of the cylinder 33 and generally coextensive of the piston 37 is a slot 42; behind the cylinder 33 lies a flat bar 43 and a cap screw 44 which extends through the bar 43, through the slot 42, and is threadedly fastened to the piston 37. At its right hand end the bar 43 is provided with a forwardly-directed arm 45 to the forward end of which is attached the outer end of the rod 38. The rod 38 is provided with a threaded portion 46 which extends through a large aperture 47 in the arm 45 and nuts 48 and 49 engage the threaded portion 46 on either side of the arm 45 to lock the rod against movement relative to the bar 43. It will be understood, then, that the piston 37 and the bar 43 move together, subject to adjustment between the threaded portion 46 and the nuts 48 and 49. At the other end of the cylinder 33 it is provided with a second piston 51. Rearwardly of this piston the cylinder 33 is provided with a slot 52; a cap screw 53 extends from the bar 43 through the slot 52 into the piston 51 so that the bar 43 and the piston 51 are normally locked together and, therefore, move together. It should be noted, as is particularly evident in FIG. 2, that the cap screw 53 enters the piston 51 a distance spaced from the center of the piston so that the piston may be reversed for certain purposes by loosening the cap screw 53 and reversing the piston in the cylinder. The cylinder 33 is, of course, mounted on the table 23 and from the rear of the table 23 extends a support plate 54 to which is hinged, by means of a horizontal pivot pin 55, a bell crank 56. The bell crank is provided with a bifurcated arm 57 which straddles a pin 58 extending from the rear of the bar 43. It is also provided with another arm 59 which engages a pin 61 extending forwardly from a plunger 62 associated with the piston of the main feed cylinder 22. This plunger has its lower end residing in a bore 63 extending vertically through the feed tube 27. This tube is also provided with a branch bore 64 which extends upwardly at an angle to join the chute 32.

FIGS. 5 and 6 show the details of the cut-off apparatus, indicated generally by the reference numeral 65. The upper platen 16 is provided with an aperture 66 through which extends the feed portion of the upper half 17 of the die which consists of a passage 67 leading to the die cavity. Extending across the upper surface of the platen 16 is a diagonal, shallow groove 68 in which lies a cut-off member 69 in the form of an elongated strip of metal which fits exactly into the groove and which is flush with the upper surface of the platen 16. The cut-off member is provided with a small aperture 71 which is tapered and which has its larger end facing downward. At its larger end it is slightly smaller than the passage into the die 17. At its rearward end the cut-off member 69 is attached to the piston rod 72 of a cut-off cylinder 73. As is evident in FIG. 6, an injection nozzle 74 overlies the platen 16 and is provided with a bore 75 exactly aligned with the passage 67 into the die 17. The cut-off member 69 is connected to the piston rod 72 by fitting 76 which compensates for the fact that the centerline of the piston rod 72 is parallel ot but spaced from the level of the cut-off member.

Referring now to FIG. 7, it can be seen that the machine is provided with a hydraulic fluid sump 77 which is connected by a line 78 to the input side of a pump 79 which is driven by an electric motor 81. The output side of the pump 79 is connected by a line 82 to an electrically-operated solenoid valve 83 having an actuating coil 84. The valve is also connected by a return line 85 to the sump. From the valve extends a line 86 and a line 87, the valve being so constructed that pressure oil appears on either line 86 or line 87 and the line which does not carry the high-pressure oil is connected to the return line 85. The line 87 is connected by a line 88 to the piston rod end of the cut-off cylinder 73 and is also connected by a line 89 to the piston rod end of the main feed cylinder 22. The line 86 is connected by a line 91 to the other end of the cut-off cylinder 73 and by a line 92 to the other end of the main feed cylinder 22. The coil 84 is connected through a switch 93 to a source of direct current electricity 94. The switch 93 may be one of the control buttons 31 or it may be an automatic limit switch built into the mechanism.

The operation of the apparatus will now be readily understood in view of the above description. The operator, by manipulating the proper control button 31, energizes the motor 81 causing the pump 79 to be driven. This makes positive oil pressure available for the operation of the various cylinders in the machine. Ordinarily, the machine will operate through a cycle without assistance from the operator, once he has set the cycle in motion by pushing a control button. The lower platen 14 is moved rearwardly, carrying the lower half 15 of the die with it. Then, the table 13 is moved vertically upwardly bringing the two halves of the die together. Once the die has been assembled in this manner, the apparatus proceeds to inject molten plastic. The main feed cylinder 22 is provided with pressure oil through the line 86 and the line 92 and its piston moves downwardly carrying with it the plunger 62 which travels through the bore 63 of the tube 27. The plunger 62 compresses the plastic which has previously arrived at the bore 63 from the branch bore 24 and moves it downwardly through the bore and through the heating apparatus 28. At that position, the raw plastic is reduced to a molten state by heat and flows (under the pressure brought about by the plunger 62) through the bore 75 in the nozzle 74. At this time, the aperture 71 in the cut-off member 69 is aligned with both the bore 75 and with the passage 67 into the die 17. The plunger 62 forces the plastic into the cavity of the die with considerable pressure. When the plunger reaches the bottom of its stroke, the valve 83 is actuated by a suitable limit switch so that positive pressure appears in the line 87 and in the line 89 on the underside of the piston of the main feed cylinder 22. The piston is then raised and eventually reaches the top of its cylinder ready for the next pressure feeding and plastic injecting portion of the cycle. Now, at the same time that plastic is being forced under pressure into the die, the downward movement of the plunger 62 carries with it the pin 61 which strikes against the arm 59 of the bell crank 56 and rotates it, as is shown in FIG. 3, in a counter-clockwise direction. When the bell crank operates in this way, the bifurcation in the arm 57 carries the pin 58 to the right in FIG. 2 and, since the pin 58 is connected to the bar 43, the bar goes in this direction also. The movement of the bar operates through the cap screw 53 and through the cap screw 44 to move the pistons 37 and 51 to the right. At the end of the cycle the gap 95 between the two pistons has moved into position underlying the first opening 34 in the cylinder 33. Raw plastic flows from the hopper 25 through the opening 34 into the gap 95 until the gap is completely filled. When the plunger 62 reverses its motion and moves upwardly, carrying the pin 61 with it, an arm 96 on the bell crank 56 is eventually engaged by the pin causing the bell crank to rotate in a clockwise direction and this carries the bar 43 to the left in FIGS. 2 and 3. The arm 96 is separated from the arm 59 a considerable distance, so that the lower end of the plunger 62 is above the branch bore 64 before the new batch of plastic is released. Therefore, after a lag, the pistons are moved so that the gap 95 moves from its position underlying the first opening 34 to a second position underlying the second opening 35. The raw plastic contained in the gap 95 flows through the aperture 36 in the table 23 into the chute 32. The raw plastic can then flow from the chute 32 through the branch bore 24 into the main vertical bore 63 and is ready for the next injection cycle.

At the same time that pressure oil was presented by the line 86 to the line 92 connected to the top of the main feed cylinder 22, the same positive oil pressure appears in the line 91 leading to the outer end of the cut-off cylinder 73. This cylinder is much smaller than the main feed cylinder and, therefore, its piston travels very rapidly to the other extreme of the cylinder, the oil at the piston rod end of the cylinder being pumped to exhaust in the usual way. The actuation of the cylinder 73 causes a corresponding motion of the piston rod 72 and of the cut-off member 69; this member moves so that the aperture 71 is aligned with the bore 75 of the nozzle and with the passage entering the die. It arrives at this position very quickly, as has been stated, because of the small capacity of the cylinder 73 and is ready for the pressurized, fluid plastic to flow into the die. When the injection cycle is finished and the plunger 63 has reached the bottom of its stroke, the oil flow is reversed by the valve 83 and positive pressure appears in the line 87 and in the lines 89 and 88. The pressure of oil in the line 89 causes the piston of the main feed cylinder to start to rise and the pressure in the line 88 causes the piston rod 72 to move rearwardly in the cut-off cylinder 73. The cut-off cylinder being small, it moves very rapidly, so that the aperture 73 in the cut-off member 69 is instantaneously removed from its position of alignment with the bore 75 and with the passage 67 entering the die 17. The net effect is that the flow of plastic is cut off very rapidly and, when the die is subsequently opened by the downward movement of the table 13, there is no festoon or "dribble" of the plastic (which is still soft) from the bore 75 of the nozzle 74. There is, however, a small plug of plastic which remains in the aperture 71. At the start of the next cycle, when the cut-off member 69 is brought into alignment with the passage entering the die 17, this small plug falls downwardly into the die, is absorbed in a natural way, and does not interfere with die or machine operation.

It can be seen, then, that by the operation of the present invention it is possible to operate the injection molding machine without the dribble which has been experienced in the past with subsequent malfunctioning of the dies and machine. At the same time, the amount of raw plastic which is introduced into the path of the plunger 62 is determined with very great accuracy by the setting of the gap 95 by means of the nuts 48 and 49. It will be understood that the fact that the surface 39 of the piston 37 is inclined slightly permits very fine adjustment of the gap 95. It is the nature of the granulated, raw plastic to resist flow through a passage of less than a minimum size. For instance, in the average commercial case, a passage (Whether it be vertical or horizontal) less than approximately ¼ inch wide will not permit the granules to flow readily. In many instances, the granules will jam in the passage. By using the inclined surface of the piston 37 in opposition to the perfectly straight plane surface of the other piston 51 (which plane surface end is at right angles to the axis of the cylinder 33) it is possible to make very fine adjustments, particularly in the small feed range, because one portion of the gap 95 may be less than the minimum flow spacing, while another part may be greater than the minimum flow spacing. If both pistons were provided with flat surfaces extending at right angles to the axis of the cylinder, it would not be possible to meter small amounts of raw plastic. Also, it has been found that, in the absence of the flat 41 formed on the top of the piston 37, the piston picks up plastic granules and these are jammed between the surface of the piston and the surface of the cylinder as the piston moves from the first position under the first opening 34 to the second position overlying the second opening 35. By use of the flat 41, it has been found that this jamming of the granules of raw plastic is prevented. It should be noted that the maximum distance from the flat 41 to the surface of the cylinder 33 is selected to be at least as small as the minimum flow gap described above in connection with the particular plastic used. This means that, even though the granules are not jammed, nevertheless, plastic is not permitted to flow from the hopper 25 to the chute 32 during this part of the cycle. Naturally, such by-passing or flowing during the discharge or second position condition of the apparatus would lead to very inaccurate metering. By presenting an exact amount of raw plastic to the apparatus in the manner described, it is possible to avoid either underfilling the die or overfilling the apparatus. Overfilling results in the accumulation of extra plastic which leads to excess flash on the finished product and the leakage of various parts of the machine. Naturally, if the plunger 62 in its downward movement has filled the die and it still has further downward motion before its return motion is started, considerable pressure will be built up in the plastic and the cylinder 22 will stall, unless the plastic leaks out in some manner to relieve the situation.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An injection molding machine for use with a separable die, comprising a main feed apparatus having a plunger movable to feed plastic to the die, a heating apparatus through which the plastic passes on its way to the die, a platen on which the die is mounted having a vertical passage leading to the die, an injection nozzle connected to the heating apparatus and having a vertical passage lying in alignment with and close to the passage in the platen, an apertured hoizontal plate movable between the nozzle and the platen, the plate being an elongated strip slidable in a groove formed in the upper surface of the platen, the plate being provided with upper and lower plain surfaces, the upper surface engaging the nozzle and the lower surface engaging the platen, the said aperture in the plate being tapered with its large end downward and the passage in the platen being at least as large as the largest dimension of the aperture, and means connecting the plate to the main feed apparatus to move it horizontally at the end of the feeding stroke of the plunger from a first position in which the aperture in the plate is aligned with the passage in the platen to a second position in which the aperture is not so aligned, the plate being movable by means of a cut-off cylinder, the cylinder being mounted in parallel with the main feed cylinder to produce synchronous actuation thereof, the cut-off cylinder being considerably smaller than the main feed cylinder so that the plate reaches the first position a considerable period of time before the main feed cylinder reaches its extreme position.

2. An injection molding machine for use with a die, comprising a main feed apparatus movable to feed plastic along a bore leading to the die, a hopper into which the raw plastic is inserted, a feed regulating means connecting the hopper to the bore, the said means having a horizontal cylinder with a first opening aligned with the hopper and a second opening spaced horizontally from the first opening aligned with a passage leading to the said bore, two pistons slidable in the cylinder and having a gap between them, the main feed apparatus consisting of a vertical cylinder and the cylinder of the feed regulating means extending horizontally, a bellcrank connecting the two cylinders so that vertical movement of the main feed apparatus causes horizontal movement of the pistons of the feed regulating means, the pistons of the feed regulating means having adjacent end surfaces lying at an angle to one another, one of the pistons of the feed regulating means lying between the two openings when the pistons are in the second position, the said one of the pistons being provided with a flat surface which faces toward the first opening and extends along the piston for such a distance that it is always exposed through the first opening, and means connecting the main feed apparatus to the feed regulating means to move the pistons together from the first position in which the gap is coextensive with the first opening to a second position in which the gap is coextensive with the second opening.

3. An injection molding machine for use with a separable die, comprising a main feed apparatus having a plunger movable to feed plastic along a bore leading to the die, a heating apparatus through which the plastic passes on its way to the die, a hopper into which raw plastic is inserted, a platen on which the die is mounted having a vertical passage leading to the die, an injection nozzle connected to the heating apparatus and having a passage lying in alignment with and close to the passage in the platen, a feed regulating means connecting the hopper to the bore, the said feed regulating means having a horizontal cylinder with a first opening aligned with the hopper and a second opening aligned with the passage leading to the said bore, two pistons slidable in the cylinder and having a gap between them, the main feed apparatus consisting of a vertical cylinder and the cylinder of the feed regulating means extending horizontally, a bellcrank connecting the two cylinders so that vertical movement of the main feed apparatus causes horizontal movement of the pistons of the feed regulating means, the pistons of the feed regulating means having adjacent end surfaces lying at an angle to one another, means connecting the main feed apparatus to the feed regulating apparatus to move the pistons together from a first position in which the gap is coextensive with the first opening to a second position in which the gap is coextensive with the second opening, one of the pistons of the feed regulating means lying between the two openings when the pistons are in the second position, the said one of the pistons being provided with a flat surface which faces toward the first opening and extends along the piston for such a distance that it is always exposed to the first opening, an apertured horizontal plate movable horizontally between the nozzle and the platen, the plate being an elongated strip slidable and in a groove formed in the upper surface of the platen, the plate being provided with upper and lower plane surfaces, the upper surface engaging the nozzle and the lower surface engaging the platen, the said aperture in the plate being tapered with its large end downward and the passage in the platen being at least as large as the largest dimension of the aperture, and means connecting the plate to the main feed apparatus to move it from a first position in which the aperture and the plate is aligned with the passage in the platen to a second position in which the aperture is not so aligned, the plate being movable by means of a cut-off cylinder, the cylinder being mounted in parallel with the main feed cylinder to produce synchronous actuation thereof, the cut-off cylinder is being considerably smaller than the main feed cylinder so that the plate reaches the first position a considerable period of time before the main feed cylinder reaches its extreme position.

References Cited in the file of this patent
UNITED STATES PATENTS

| | | |
|---|---|---|
| 458,754 | Hoffman | Sept. 1, 1891 |
| 2,079,936 | Gastrow | May 11, 1937 |
| 2,443,554 | De Mattia | June 15, 1948 |
| 2,448,947 | Arthur et al. | Sept. 7, 1948 |
| 2,465,889 | Lester et al. | Mar. 29, 1949 |
| 2,480,313 | Alden | Aug. 30, 1949 |
| 2,501,595 | Bohannon | Mar. 21, 1950 |
| 2,841,824 | Harvey | July 8, 1958 |
| 2,862,240 | Strauss | Dec. 2, 1958 |
| 2,923,031 | Collion | Feb. 2, 1960 |
| 2,988,779 | Barton et al. | June 20, 1961 |
| 2,992,455 | Salzman | July 18, 1961 |
| 3,014,242 | Baker et al. | Dec. 26, 1961 |